United States Patent [19]

Holiday et al.

[11] Patent Number: 5,779,861
[45] Date of Patent: Jul. 14, 1998

[54] METHOD FOR TREATING PROCESS CONDENSATE

[75] Inventors: Allan Holiday, Overland Park, Kans.; Ralph A. Scott, Pineville, La.

[73] Assignee: Farmland Industries, Inc., N. Kansas City, Mo.

[21] Appl. No.: 617,324

[22] Filed: Mar. 18, 1996

Related U.S. Application Data

[63] Continuation-in-part of Ser. No. 539,830, Oct. 6, 1995, Pat. No. 5,643,420, which is a continuation-in-part of Ser. No. 323,855, Oct. 17, 1994, Pat. No. 5,498,317, which is a division of Ser. No. 116,863, Sep. 3, 1993, Pat. No. 5,385,646.

[51] Int. Cl.$^6$ .................................................... B01D 3/38
[52] U.S. Cl. ................. 203/11; 203/75; 203/76; 203/77; 203/92; 203/93; 203/94; 423/352; 518/704; 518/705; 568/913
[58] Field of Search ................. 203/10, 11, 12, 203/14, 75–76, 92–94, 98, DIG. 6, 77, 49, 95, 96; 423/352, 359; 568/913; 518/705, 704; 422/187; 159/16.3; 202/203

[56] References Cited

U.S. PATENT DOCUMENTS

| | | | |
|---|---|---|---|
| 3,011,969 | 12/1961 | Mader | 208/150 |
| 3,404,072 | 10/1968 | Bollen et al. | 203/1 |
| 3,518,166 | 6/1970 | Klett | 203/78 |
| 3,636,106 | 1/1972 | Villiers-Fisher | 564/71 |
| 3,922,222 | 11/1975 | Van Moorsel | 203/11 |
| 3,936,500 | 2/1976 | Kaasenbrood et al. | 564/70 |
| 4,110,087 | 8/1978 | Nolley, Jr. | 95/179 |
| 4,138,434 | 2/1979 | Lagana et al. | 564/69 |
| 4,155,804 | 5/1979 | Edge Jr. | 162/16 |
| 4,235,816 | 11/1980 | Lagana et al. | 564/72 |
| 4,260,462 | 4/1981 | Didyez et al. | 203/22 |
| 4,321,410 | 3/1982 | Ono et al. | 564/67 |
| 4,330,307 | 5/1982 | Coury | 62/618 |
| 4,347,385 | 8/1982 | Scoggin | 568/72 |
| 4,376,758 | 3/1983 | Pagani et al. | 423/359 |
| 4,422,903 | 12/1983 | Messick et al. | 203/19 |
| 4,444,571 | 4/1984 | Matson | 95/48 |
| 4,464,228 | 8/1984 | Roensch | 203/49 |
| 4,522,979 | 6/1985 | Stokes | 525/66 |
| 4,539,077 | 9/1985 | Jonckers et al. | 203/49 |
| 4,566,947 | 1/1986 | Tsuruta | 203/26 |
| 4,587,373 | 5/1986 | Hsia | 585/639 |

(List continued on next page.)

OTHER PUBLICATIONS

Combined Treatment of Ammonia/Urea Process Condensates, R.B. Strait, The M.W. Kellog Company, presented at the Gulf Coast Ammonia Producers Meeting, Apr. 6, 1993.

Control of Effluent in an Integrated Nitrogen Fertilizer Complex, Allan D. Holiday, Cooperative Farm Chemicals Association, presented at The Fertilizer Institute Environmental Symposium, Mar., 1978.

System Curbs Nitrogen in Plant–Effluent Streams, Chemical Engineering, Aug. 14, 1978, p. 93.

*Primary Examiner*—Hien Tran
*Attorney, Agent, or Firm*—Shook, Hardy & Bacon

[57] ABSTRACT

An apparatus and method for treating chemical production plant process condensate and low pressure purge gas such that a contaminant-rich stream is recoverable from the condensate and purge gas, wherein the contaminants are substantially removed from the condensate by steam stripping and subsequent rectification in a relatively low pressure stripping/rectification tower. The tower overhead is then condensed, and any non-condensed gases are subjected to water scrubbing, along with the low pressure purge gas to further recover contaminates from the non-condensed gas. A portion of the condensed overhead and scrubbing water containing contaminates is returned to the top of the rectification section of the tower as reflux and the balance being withdrawn as a concentrated stream for reuse in the plant. The apparatus may be used in conjunction with existing low pressure equipment, avoiding costly major modifications, and is particularly adapted to use in conjunction with ammonia and methanol plants.

23 Claims, 5 Drawing Sheets

U.S. PATENT DOCUMENTS

| | | | |
|---|---|---|---|
| 4,594,131 | 6/1986 | Maier | 203/26 |
| 4,613,697 | 9/1986 | Pagani | 564/67 |
| 4,632,676 | 12/1986 | Mosebach et al. | 95/257 |
| 4,693,883 | 9/1987 | Fleming | 423/658.2 |
| 4,801,356 | 1/1989 | Grasso | 203/11 |
| 5,011,625 | 4/1991 | LeBlanc | 252/376 |
| 5,073,669 | 12/1991 | Forte | 585/808 |
| 5,167,773 | 12/1992 | Eagan et al. | 202/158 |
| 5,170,630 | 12/1992 | Stern | 62/643 |
| 5,198,103 | 3/1993 | Meyer et al. | 208/431 |

METHOD FOR TREATING PROCESS CONDENSATE

This application is a Continuation-in-Part of U.S. patent application Ser. No. 08/539,830 filed Oct. 6, 1995, now U.S. Pat. no. 5,643,420; which is a Continuation-in-Part of U.S. Ser. No. 08/323,855 filed Oct. 17, 1994 which is now issued as U.S. Pat. No. 5,498,317; which is a Divisional application of U.S. Ser. No. 08/116,863 filed Sep. 3, 1993; which has now issued as U.S. Pat. No. 5,385,646 on Mar. 12, 1996.

BACKGROUND OF THE INVENTION

1. Field of the Invention

The present invention is generally related to industrial chemical production plants and waste water treatment, and is more specifically directed to a novel apparatus configuration and method for using the same to recover raw materials, by-products and product from the dilute process condensate and purge gas streams of chemical production plants. The recovered materials are recycled for use in the production facilities in such a manner as to avoid any significant energy or other efficiency penalties which could negatively impact the plant's operation and overall effectiveness.

2. Description of the Related Art

Large quantities of industrial waste water are daily produced by chemical production and processing plants within the United States and throughout the world. Often times, this waste water is process condensate consisting of dilute streams of raw materials, by-products and product remaining unrecovered from processing water and/or steam used in various phases of production. For example, in the production of ammonia, steam exiting the plant after use in stripping operations carries trace amounts of methanol, ammonia, carbon dioxide, alkylamines and the like. Although the materials within these streams could be utilized to form product, due to the dilute nature of the condensate, it is generally more cost efficient to simply consider the water as waste water and dispose of the same as needed.

At one time, the bulk of process condensate and industrial waste water was simply discharged into live streams or municipal sewer systems without treatment. However, in view of the potential environmental damage that could result from the release of chemicals into the water systems, as well as the need to conserve the amount of water used daily in operations, methods have been developed for treating the water to remove any contaminants therefrom and recycle the water back to phases of the plant for reuse.

In the field of ammonia production, for example, it is known to use a relatively low pressure steam stripping apparatus such as a conventional stripping tower to treat the process condensate, wherein steam is utilized to strip the contaminates from the condensate. The contaminated overhead is then vented to the atmosphere while the stripped condensate is reused in the plant as cooling tower water make-up, boiler feed water make-up and the like. Alternatively, the contaminated overhead may be destroyed or decomposed such as by burning. Although these conventional low pressure strippers are useful for this purpose, the amount of contaminants and/or noxious vapors vented to the atmosphere is undesirable. In fact, the type and amount of such emissions is the subject of increasingly stringent regulation by the Environmental Protection Agency (EPA), as well as other state and local officials. It is anticipated that the level of emissions now permitted will be substantially reduced in the future, particularly as to potentially harmful compounds such as ammonia and methanol, and will perhaps eventually be prohibited altogether.

In order to overcome these emission problems, a more recently developed method of treating ammonia plant process condensate utilizes relatively high pressure condensate stripping towers, generally operating at 500 pounds pressure (psi) or more to strip contaminants from the condensate. In this method, the high pressure process steam carries the contaminated stripper overhead back to the plant for use in the primary reformer stage of production. Although return of the contaminates to the ammonia plant avoids undesirable venting of contaminants into the atmosphere, injection of the relatively high pressure stream of overhead into the plant requires that the flow of this high pressure stream into the plant be controlled and that this additional stream be taken into account along with the normal steam flow in setting the steam-to-gas ratio. This has the effect of lowering the front-end pressure of the system, lowering ammonia plant capacity and efficiency as well as complicating process control overall. In addition, the high pressure strippers are relatively expensive and their use requires the complete replacement of the more conventional low pressure strippers that are presently used in many plants throughout the world.

In addition to process condensate which comprises aqueous streams of dilute contaminates, many chemical production plants also produce gaseous streams comprised of a mixture of hydrogen, nitrogen, argon, methane, and the like contaminated with small amounts of raw materials, by-products and product of the plant. These gases may be formed in many different stages of production and are known to build-up in the conversion loops and processing stages of the plant, thereby retarding reaction rates and reducing efficiency. For this reason, contaminated gases are commonly purged from the plant and directed to a furnace firebox wherein the combustibles are burned and inert non-combustibles are vented to the atmosphere.

There are two problems associated with disposing the purged gases in this manner. Firstly, the contaminates which include starting materials and products of the chemical production plant are not recovered for further use in the plant and instead are simply disposed of with the waste gases. Secondly, the contaminates and/or by-products thereof formed during combustion may be considered pollutants such that venting these contaminates and by-products to the atmosphere is undesirable. For example, in the case of an ammonia production plant, the purge gas will generally comprise ammonia which will be converted to noxious $NO_x$ compounds when burned in the firebox.

In order to eliminate this problem, some purged gases are removed from the plant under high pressure, whereafter some contaminates (e.g. ammonia in an ammonia plant) are removed by scrubbing and other gases (e.g. nitrogen) are removed by prism or membrane technologies before the gaseous stream is sent to the firebox. In these systems, the scrubbing water containing ammonia can be injected back into the plant under pressure, such as to the mixed feed coil or air coil in an ammonia plant. While this method of removing and treating purged gases under high pressure is useful in many systems, in other circumstances it is not feasible to remove the gases from a specific processing step under high pressure. Furthermore, the dilute and low volume nature of the gases may not be worth the effort and expense necessary for high pressure removal and treatment. Thus, in many instances, low pressure purge gases are simply sent to a firebox for disposal resulting in a loss of starting materials and product, and the venting of certain pollutants.

Therefore, it is a primary object of the present invention to provide an apparatus and method of treating chemical plant process condensate and/or low pressure purge gas. wherein the raw materials. product and by-products (hereinafter referred to collectively as "contaminants") in the condensate are recovered from the water for reuse in the plant.

It is another object of the present invention to provide an apparatus and method of treating process condensate and/or low pressure purge gas. wherein contaminants in the condensate can be recovered and returned to the plant without accruing significant efficiency penalties to the plant or requiring plant modification.

It is another object of the present invention to provide an apparatus and method of treating process condensate and/or low pressure purge gas. wherein a conventional low pressure steam stripping tower may be utilized.

Another object of the present invention is to provide an apparatus and method of treating process condensate and/or low pressure purge gas. wherein a plant using a conventional low pressure steam stripping tower for condensate treatment can be retrofitted to enable the concentrating and recycling of recovered contaminants back to the plant.

It is another object of the present invention to provide an apparatus and method of treating process condensate and/or low pressure purge gas that is relatively efficient and cost effective.

A further object of the present invention is to provide an apparatus and method of treating process condensate and/or low pressure purge gas wherein contaminant air emissions are greatly reduced.

Yet another object is to provide an apparatus and method of treating process condensate. wherein a substantial amount of the water in the condensate can be recovered having a reduced contaminant content so as to be suitable for reuse in the plant as boiler feedwater make-up which requires high quality. low conductivity water.

Yet a further object of the present invention is to provide an apparatus and method of treating ammonia and/or methanol plant process condensate and/or low pressure purge gas meeting the objectives heretofore described.

SUMMARY OF THE INVENTION

These and other objects are achieved by a novel apparatus configuration and method of using the same to recover product. by-products and raw materials from the process condensate of a chemical production plant. The method comprises stripping the contaminants from the condensate in a relatively low pressure stripping section of an upright tower to obtain a contaminant-rich vapor and an aqueous bottom stream of reduced contaminant content. This vapor is then rectified in a rectification section of the tower to obtain a concentrated overhead stream. The overhead is then condensed and any remaining vapor is passed through a vapor scrubber to recover any trace amounts of contaminates into condensed form. A portion of the condensed overhead stream is then returned to the top of the rectification section of the tower as reflux. and the balance is withdrawn as a concentrated stream for re-use in the plant.

In a preferred embodiment. low pressure purge gas from the plant comprising a gaseous stream of dilute contaminates may also be treated in combination with the process condensate. In this embodiment. the purged gas is delivered to the vapor scrubber so as to recover any trace amounts of contaminates from the gaseous stream into condensed form. The condensed contaminate stream is then combined with the condensed overhead formed by the process condensate and delivered to the rectification tower as reflux and/or withdrawn for re-use in the plant in accordance with the invention.

Due to the low volume nature of the concentrated overhead stream withdrawn. the contaminants can be efficiently injected back into the plant at the appropriate stage for decomposition. recycling and/or reuse within the plant without significant thermal. pressure or energy impact on the plant and its operation. Thus this process does not require significant plant modification and does not accrue significant efficiency penalties. As with other stripping operations. the stripped condensate is removed from the tower as bottoms liquid which may also be recycled for use as boiler feed water. cooling tower water make-up. or other suitable purposes.

In an alternative embodiment. separate stripping and rectification columns operating in series are provided. whereby the overhead vapor of the stripping column is delivered to the base of the rectification column. The rectification bottoms are returned to the top of the stripping tower for further stripping action. The concentrated overhead from the rectification column is then condensed and scrubbed. with a portion of condensed and scrubbed overhead being returned to the top of the rectification column as reflux and the remainder being withdrawn as a concentrated stream for recycling to the chemical production plant.

The method and apparatus configuration of this invention can be utilized in conjunction with conventional low pressure steam strippers. such as those previously used for treating ammonia plant or methanol plant process condensate. by retrofitting the existing stripping tower to include a rectification section at its top or by adding a separate rectification column in series. Not only does the retrofitted system eliminate the environmental concerns associated with the prior technique of venting contaminates. it enables substantially the whole of the process condensate contaminates generated by the plant to be converted into feed stock which can be recycled to the production facility for use.

This apparatus and method achieve a marked improvement in the overall economics and operation of the chemical production plant complex. making it possible to obtain the advantages now associated with relatively high pressure strippers while avoiding the enormous costs associated with such systems. and the energy and pressure penalties which necessarily accrue to the production plant via their use.

DETAILED DESCRIPTION OF THE INVENTION

The present invention is directed to a novel method and unique apparatus configuration for treating chemical production plant process condensate. The process condensate treated may generally include any effluent generated by chemical production and processing operations, and will normally comprise a dilute aqueous stream of the raw materials utilized in processing, as well as product and by-products formed in various stages of production. For purposes of this application the product, by-product and raw materials contained in the condensate shall be referred to collectively as "contaminants". Depending upon the nature of the processing steps from which the condensate is generated, this effluent may be presented for treatment in the form of a gaseous or liquid stream. The process condensate to be treated may be used at its recovery temperature without preliminary treatment and will preferably have a temperature ranging near its bubble point for the stripping operation pressure as hereafter described.

Figure 1:
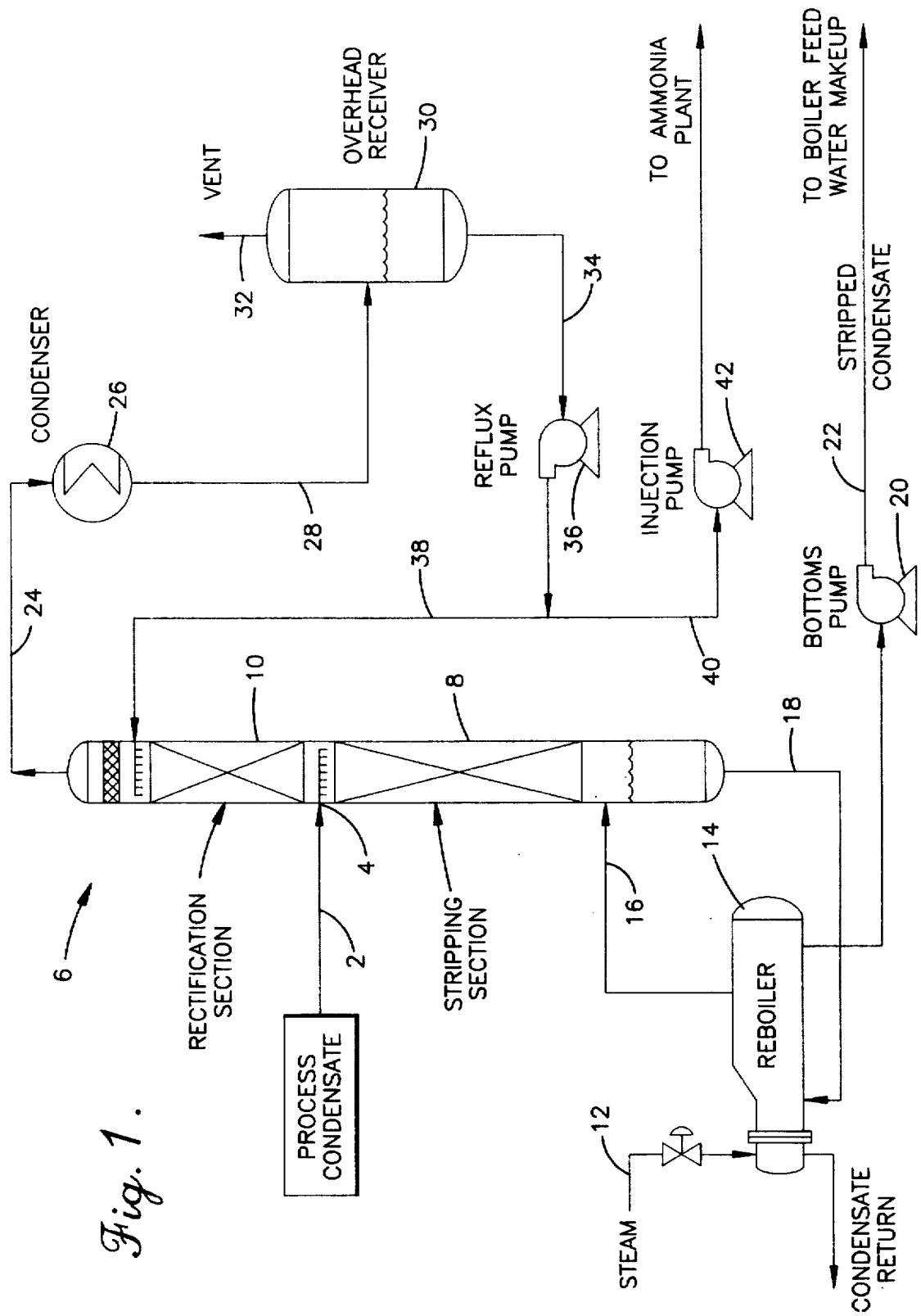
FIG. 1 is a schematic representation of an apparatus configuration having a common tower for stripping and rectification in accordance with the present invention.

Referring now to the embodiment shown in FIG. 1, a process condensate stream from a chemical production plant is fed via line 2 to an entry port 4 in the midsection of an upright cylindrical tower 6 having a closed top and bottom. Tower 6 comprises a lower stripping section 8 and an upper rectification section 10. The tower is of conventional construction, preferably a countercurrent tower of the bubble-plate or packed type operable at relatively low pressures ranging generally from 0 psia to 300 psig and most preferably ranging from about 0 psia to 100 psig.

Although any low pressure relatively inert stripping fluid is considered suitable for purposes of this invention, it is suggested to use upwardly flowing steam as the stripping gas. Steam may be supplied under low pressure through a line 12 to the tube side of a reboiler 14 generating steam that is delivered to the base of the tower via line 16. Alternately, the steam may be directly injected into the base of tower 6 (not shown).

Upon entering port 4, the process condensate flows downwardly through stripping section 8 and at least a portion of the contaminants are stripped from the condensate by steam vapor rising countercurrently through this section. The stripped condensate collected at the closed bottom of tower 6 flows to the shell side of reboiler 14 by means of line 18 and is vaporized generating steam flow to the tower via line 16. The portion of the bottoms liquid not vaporized is withdrawn from the reboiler by means of a bottoms pump 20 and is discharged along line 22 for use in various stages of chemical production. For example, the bottoms liquid of reduced contaminant content may be used as boiler feed water make-up. Alternatively, the stripped condensate can be used for cooling tower water make-up or may be directly discharged under permit into the municipal sewer system or local waterways with little or no further treatment.

The stripped contaminates in vapor pass upwardly within the tower 6 through rectification section 10. Some of the vapor is recondensed during rectification and flows downwardly within the tower to the stripping section 8 below. The remaining vapor is withdrawn from the top of tower 6 as a concentrated overhead stream. The overhead is delivered along line 24 to condenser 26 whereby the overhead is totally condensed and subcooled. Suitable condensers include, but not by way of limitation, heat exchangers, water coolers and/or air fin coolers for purposes of this invention.

The condensate is then transferred along line 28 to overhead receiver 30 which is preferably a pressure vessel receiver such as that kind conforming with ASME standards. Traces of non-condensables such as dissolved hydrogen gases, for example, may be vented from receiver 30 to the atmosphere along line 32. During start-up of the treatment process, the condensed overhead stream is withdrawn from receiver 30 along line 34 via reflux pump 36 whereby all of the condensed overhead is returned along line 38 as reflux to the top of tower 6. Although any conventional pump may be used for this purposes, an ANSI standard end suction vertical centerline discharge pump such as that available from Goulds Pumps, Inc. out of Seneca Falls, N.Y. or that offered under the tradename Durco™ from The Duriron Company Inc. out of Dayton, Ohio is considered particularly suited to this invention.

Once the contaminates reach concentrated levels within the condensed stream, preferably comparable to about a 30 to 200 fold increase in concentration over that amount in the process condensate fed to the tower along line 2, the condensed overhead stream is split such that a portion of the stream is withdrawn along line 40 at a controlled rate to provide a withdrawn stream of much greater contaminant concentration than the condensate feed. Note that this level of concentration in the withdrawn stream is about 5 to 15 times greater than it is in the overhead vapor from a process condensate stripper with no rectification. To meet this objective, the split stream is generally withdrawn at a controlled rate ranging from 3 and up to about 50% by volume of the total condensed stream. Preferably, the condensate will be withdrawn along line 40 at a rate of about 5 to 20% and most preferably about 10 to 15% by volume of the total stream so as to correspond to a reflux ratio ranging anywhere from 6:1 to 10:1 reflux to withdrawn condensate.

In this manner, the concentration level of the contaminants in the withdrawn stream is so high (having a reduced overall liquid volume) such that the thermal load transferred to the plant upon injection of the withdrawn steam back into the production plant is relatively minor in comparison to what it would be if the stripping tower overhead were totally condensed and injected directly into the plant without concentration (i.e. rectification). The withdrawn concentrated overhead is then recycled back into the plant along line 40 via injection pump 42 at the appropriate stage of the plant's operation so that the contaminants may be decomposed, reused and/or recycled for the production of chemical product.

Figure 2:
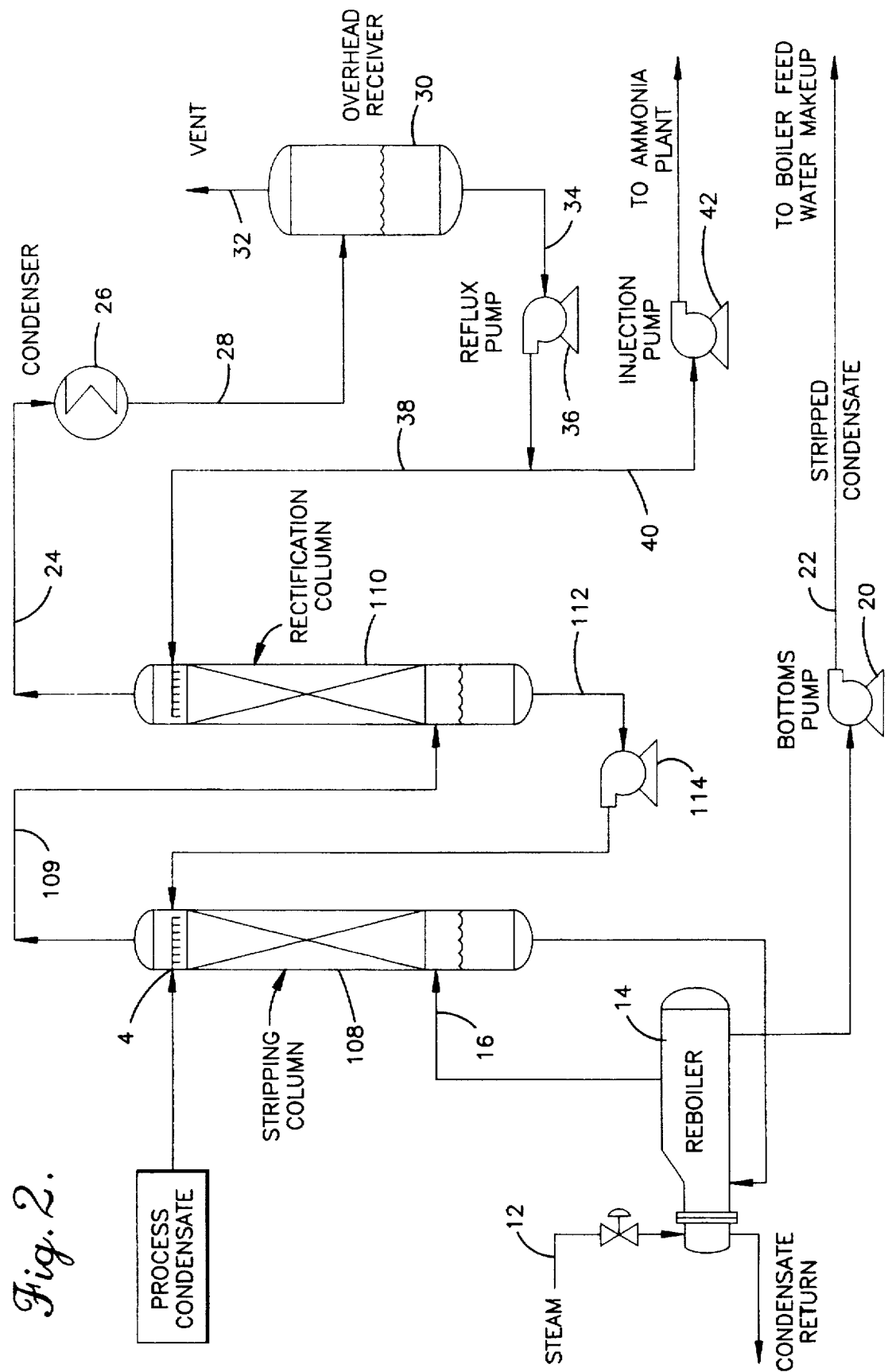
FIG. 2 is a schematic representation of an apparatus configuration having separate stripping and rectification columns in accordance with the present invention.

In an alternative embodiment as shown in FIG. 2, the stripping and rectification steps of the present invention are conducted in two separate columns presented in series. In this embodiment, the process condensate is first introduced along entry port 4 to the top of stripping column 108 and later rectified in separate rectification column 110. Each column 108 & 110 is made of conventional construction as heretofore described preferably being of the cylindrical countercurrent bubble-plate or packed type and operable at relatively low pressure. This embodiment is particularly well adapted for use in retrofitting existing low pressure steam stripping operations wherein the stripping tower is relatively small such that a rectification section cannot be fitted within the existing tower.

As in the first embodiment, steam may be supplied under low pressure to the stripping column 108 through a line 12 to the tube side of a reboiler 14 vaporizing water generating steam that flows to the base of the column via line 16. Alternately, the steam may be directly injected into the base of stripping column 108 (not shown). Upon entering port 4, the process condensate flows downwardly through stripping column 108 and at least a portion of the contaminants are stripped from the condensate by the steam vapor rising countercurrently through the column. The stripped condensate collected at the closed bottom of stripping column 108 flows to the shell side of reboiler 14 by means of line 18 where it is vaporized to steam that flows to the tower via line 16. The portion of the bottoms liquid not vaporized is withdrawn from the reboiler by means of a bottoms pump 20 which is discharged along line 22 for use in various stages of the production facilities.

The contaminant-rich vapor overhead from stripping column 108 is then supplied via line 109 to the base portion of rectification column 110. Some of the vapor is condensed during rectification and, along with reflux, subsequently flows downwardly through the column 110 to provide a bottoms liquid. The bottoms liquid is withdrawn through a line 112 via pump 114 for delivery to the top of stripping column 108 for additional stripping action. The remaining vapor is withdrawn along line 24 as a concentrated stream for subsequent condensation and use as more fully described above in conjunction with the first embodiment.

Another embodiment of the invention is specifically directed to use of the present apparatus and method of using the same for treating ammonia plant process condensate. In this embodiment, the process condensate generally comprises condensate from the reforming stages of ammonia production, water formed in CO shift converters, and secondary condensate recovered from carbon dioxide stripping operations within the plant such as from a Benfield hot potassium carbonate $CO_2$ removal system. The process condensate will include ammonia in an amount ranging anywhere from 500 to 2,000 parts per million (ppm) by weight of the condensate, methanol in amounts ranging from about 100 to 800 ppm by weight of the condensate, as well as trace amounts of other by-products, raw materials and impurities such as alkylamines and dissolved nitrogen and hydrogen gas. The process condensate may be utilized for purposes of this invention at its recovery temperature (recovery from the plant) which generally ranges from 150° to 250° F. and is most preferably at a temperature near the bubble point of the condensate for the tower operation pressure.

Figure 3:
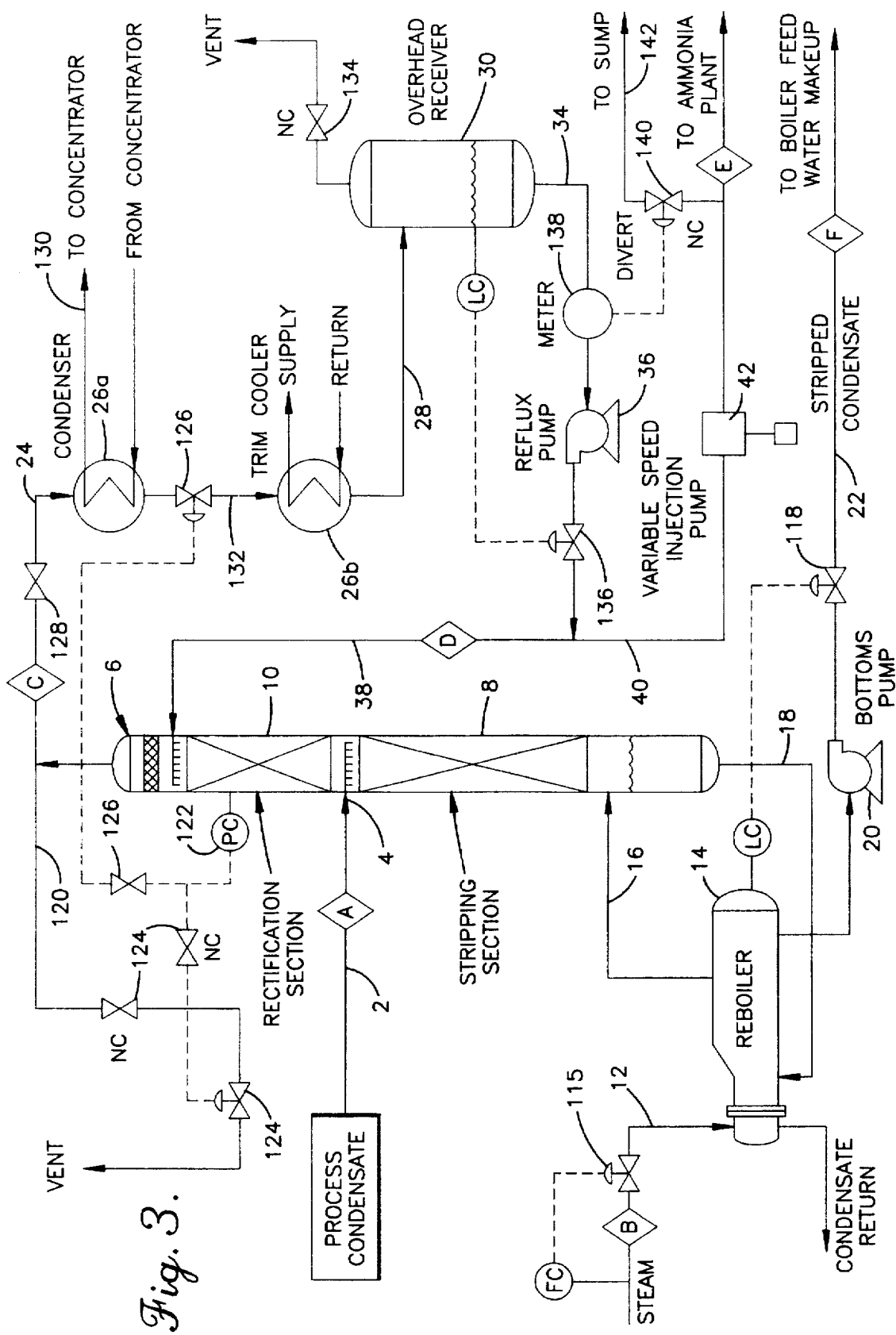
FIG. 3 is a schematic representation of a preferred embodiment of the invention of FIG. 1. wherein the apparatus is provided for the treatment of ammonia plant process condensate.

A further preferred embodiment of the invention is shown in FIG. 3. Looking to FIG. 3, the ammonia plant process condensate is fed via line 2 to an entry port 4 in the midsection of an upright cylindrical tower 6 comprising a lower stripping section 8 and an upper rectification section 10. The tower is of conventional construction as heretofore described in the first embodiment operable at relatively low pressures ranging generally from 0 psia to 300 psig and most preferably ranging from about 10 to 100 psig. Steam is supplied under low pressure through a line 12 to the tube side of a reboiler 14 with flow to the reboiler being controlled by flow control valve 115 generating steam in the reboiler which is delivered to the base of the tower via line 16.

Upon entering port 4, the process condensate flows downwardly through stripping section 8 and the contaminants are stripped from the condensate by steam vapor rising countercurrently through this section. The stripped condensate collected at the closed bottom of tower 6 flows to the shell side of reboiler 14 by means of line 18 and is vaporized generating steam to the tower via line 16. A portion of the bottoms liquid is withdrawn from the reboiler controlled by a level control valve 118 by means of a bottoms pump 20 which is discharged along line 22 for use as boiler feed water make-up or cooling tower water make-up in the ammonia plant.

The stripped contaminate-rich vapor passes upwardly within the tower through rectification section 10. Some of the vapor is recondensed during rectification and flows downwardly within the tower to the stripping section 8 below. The remaining vapor is withdrawn from the top of tower 6 as a concentrated overhead stream. During initial start-up of the system, the overhead from tower 6 is diverted along line 120 and vented to the atmosphere until the pressure and composition of the overhead stream approach design conditions within the rectification section 10 of tower 6. This pressure is controlled by pressure controller 122 which is connected to valves 124 and valves 126 such that until equilibrium is reached, the overhead will flow along line 120 with flow via line 24 to the condenser blocked by valve 128. Once equilibrium is reached, line 120 is closed and line 24 opened.

The overhead is then delivered along line 24 to first condenser 26a whereby the overhead stream is totally condensed. First condenser 26a is in the form of a heat exchanger, wherein the preferred coolant is a dilute solution of ammonium nitrate which upon heating will then be delivered to a concentrator (not shown) in the ammonia plant. A complete description of such a concentrator system appears in Holiday, *System Curbs Nitrogen in Plant-Effluent Streams*, CHEMICAL ENGINEERING (Aug. 14, 1978) incorporated herein by reference. In this embodiment, the waste water stream from the concentrator is thus used for heat exchange with the tower overhead stream and the heated cooling water is then recycled along line 130 back to the concentrator for reuse. Although direct heat exchange is contemplated for use in this embodiment, indirect heat exchange is deemed suitable for these purposes and may be advisable in certain circumstance to eliminate the risk of leakage of the waste water stream into the overhead stream. An indirect heat transfer system would of course require additional equipment such as an additional holding tank, fluid pump and heat exchanger.

It should be understood that the cooling fluid stream of the heat exchanger could have its source in any number of plant operations, whereby the heated stream may be returned for recycled use in the plant. Alternately, cooling tower water can be used in the heat exchangers to condense the overhead. In another alternate condensing mode, an air fin condenser could be used.

After condensing, the condensate is directed along line 132 and is further subcooled to reduce the vapor pressure in trim cooler 26b preferably to a temperature ranging from 100° to 150° F. with a vapor pressure ranging from 2 to 8 psia. The subcooled condensate is then directed along line 28 to receiver 30 wherein normally closed valve 134 may be opened to allow traces of non-condensables in the condensed overhead to be vented to the atmosphere. This valve may be operated manually or by monitoring the pressure within the receiver. The condensate is withdrawn from the receiver 30 in conjunction with level control valve 13G at a rate corresponding with the level of fluid collected within the receiver.

In the embodiment shown in FIG. 3, a meter 138 is provided along line 34 to monitor the content of the condensed overhead stream as it exits the overhead receiver 30 to assure that the condensed stream is free of any unwanted contaminates. For example, ammonium nitrate contained in the heat exchanger loop described above could potentially leak into the stream during heat exchange. The presence of such ammonium nitrate could be detrimental to the operation of the ammonia plant if recycled to the plant as is contemplated by this invention. Thus a meter of any type deemed suitable for purposes of recognizing unwanted contaminates is connected to diversion valve 140 which is normally closed. Should any unwanted contaminates be present in the condensed stream, the stream will automatically stop feeding line 40 and instead be diverted along line 142 to a sump or other waste containment region. In this manner, the integrity of the ammonia plant process is not in any way jeopardized by the injection of the condensed stream into the ammonia plant. In a preferred embodiment, when the heat exchanger coolant above is provided from the ammonia plant concentrator, meter 138 is an ion specific electrode for nitrate.

Initially, all of the condensed overhead withdrawn from receiver 30 is returned to the top of tower 6 as reflux until the contaminates reach concentrated levels within the condensed stream, preferably comparable to about a five to fifteen fold increase in concentration over that amount of contaminants that would be in a conventional stripper overhead steam vent. This concentration is about 40 to 120 times greater than in the process condensate feed to the tower. The condensed overhead stream is then split such that a portion of the stream is withdrawn along line 40 preferably at a rate of about 5 to 20% and most preferably about 10 to 15% by volume of the total stream so as to correspond to a reflux ratio ranging anywhere from 6:1 to 10:1 reflux to withdrawn condensate. As is shown in Table I below, in a most preferred embodiment of the invention, the condensed stream is withdrawn at a reflux rate of about 8:1 reflux to withdrawn condensate.

deemed suitable, in one embodiment of the invention the concentrated stream is fed along line 40 and injected to the gas and steam mixed feed coil of the primary reformer or to the air preheat coil of the secondary reformer of the plant. In any event, in order to eliminate any pressure penalties on the ammonia plant, the concentrated stream should be injected back into the plant under pressures on the order of 500 to 600 psi, or to any other pressure equivalent to the pressure of the stream in which it is placed.

For these purposes, injection pump 42 is preferably a high differential pressure positive displacement reciprocating pump having a variable frequency motor such those manufactured by Union Pump Company out of Michigan, Wilson Snyder Pumps out of Texas or Milton Roy Co. out of Pennsylvania. These pumps are preferred to assure that the condensed overhead is efficiently withdrawn at a relatively low rate in accordance with the present invention, and delivered to the ammonia feed coil at relatively high pressures. Of course a high speed centrifugal pump could also be used for purposes of this invention, but may be less efficient in view of the low rate of withdrawal required.

Figure 4:
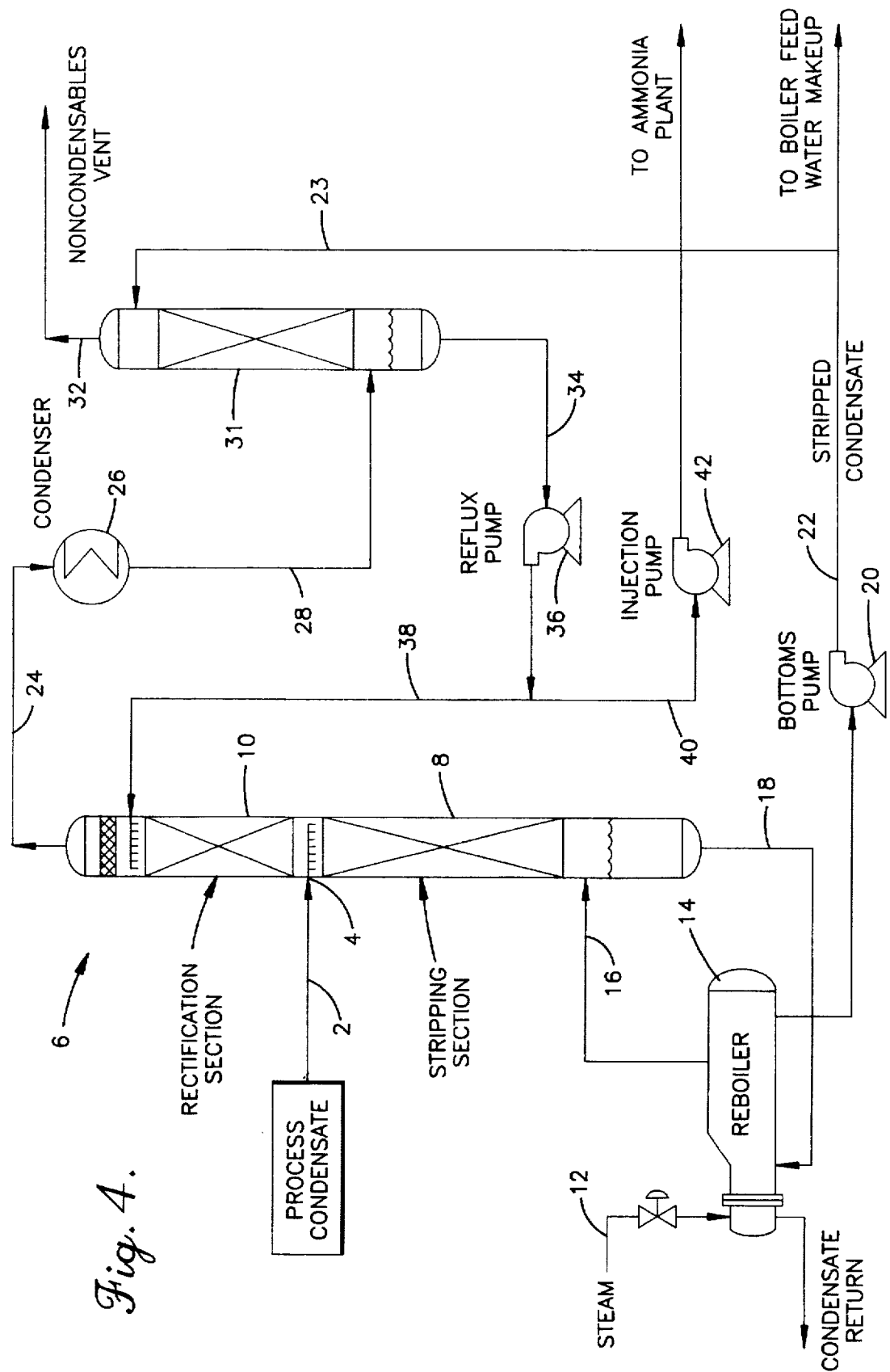
FIG. 4 is a schematic representation of a further embodiment of the apparatus configuration of FIG. 1. wherein a vent scrubber having an extended sump is utilized to recover contaminants from any remaining vapor in the condensed overhead.

In yet another embodiment of the invention, it has been found that the percentage of contaminates recovered from the process condensate can be increased by scrubbing any non-condensed vapors remaining after condensing the overhead withdrawn from the stripping/rectification tower(s). In this manner, trace amounts of ammonia, methanol, and other contaminates contained within the non-condensed vapors are recovered for re-use in the plant. This may be accomplished as shown in FIG. 4, whereby the overhead receiver is replaced by a vent gas scrubber 31 having an extended sump.

TABLE I

EXAMPLE MATERIAL BALANCE OF AN OPERATING CONDITION USING THE APPARATUS CONFIGURATION OF FIG. 3

|  | A | B | C | D | E | F |
|---|---|---|---|---|---|---|
| Water, Lbs/Hr | 149,740 | 32,700 | 24,676.29 | 21,934.48 | 2,741.81 | 146,998.19 |
| Ammonia, Lbs/Hr | 225 |  | 2,023.65 | 1,798.80 | 224.85 | 0.15 |
| Methanol, Lbs/Hr | 35 |  | 300.06 | 266.72 | 33.34 | 1.66 |
| Total, Lbs/Hr | 150,000 | 32,700 | 27,000 | 24,000 | 3,000 | 147,000 |
| Pressure, PSIG | 28 | 50 | 29 | 60 | 650 | 30 |
| Temp, °F. | 238 | 297 | 234 | 120 | 120 | 274 |

TABLE II

PERFORMANCE FOR VARIED OVERHEAD WITHDRAWAL RATES CALCULATED FOR APPARATUS CONFIGURATION OF FIG. 3

| Overhead Withdrawal Rate #/Hr[1] | 3000 | 917 |
|---|---|---|
| Reflux Ratio | 8.0 | 27.5 |
| $NH_3$ in Withdrawn Overhead, wt % | 7.5 | 24.5 |
| MeOH in Withdrawn Overhead, wt % | 1.1 | 3.6 |
| $NH_3$ in Bottoms, ppm[2] | 1.0 | 1.75 |
| MeOH in Bottom, ppm[2] | 11.3 | 14.1 |
| % of Flood | 80 | 80 |
| Theoretical Stages | 12 | 12 |

[1]Pumped to ammonia plant (stream E in FIG. 3)
[2]Concentrations in stripped condensate (stream F in FIG. 3)

*1 Pumped to ammonia plant (stream E in FIG. 3)
*2 Concentrations in stripped condensate (stream F in FIG. 3)

The withdrawn concentrated overhead is then recycled back into the ammonia plant along line 40 via injection pump 42 at different stages of the ammonia production operation. Although it should be understood that the concentrated overhead stream may be utilized in any manner In practice, overhead vapor is withdrawn from the top of tower 6 along line 24 and is condensed in condenser 26. The condensed overhead and any remaining non-condensed vapors are then delivered to the base or extended sump of vent gas scrubber 31. The non-condensed vapors pass upwardly through the scrubber countercurrent to the flow of scrubbing water which is supplied to the top of the scrubber along line 23. As shown in FIG. 4, the scrubbing water may be supplied by the bottoms liquid removed from the bottom of tower 6. Contaminates within the vapor are recovered in the scrubbing water and collected at the base of the scrubber as condensed overhead. The remaining non-condensable gases are then vented to the atmosphere through vent 32. The condensed overhead is withdrawn along line 34 and further processed in accordance with the invention as previously described.

Figure 5:
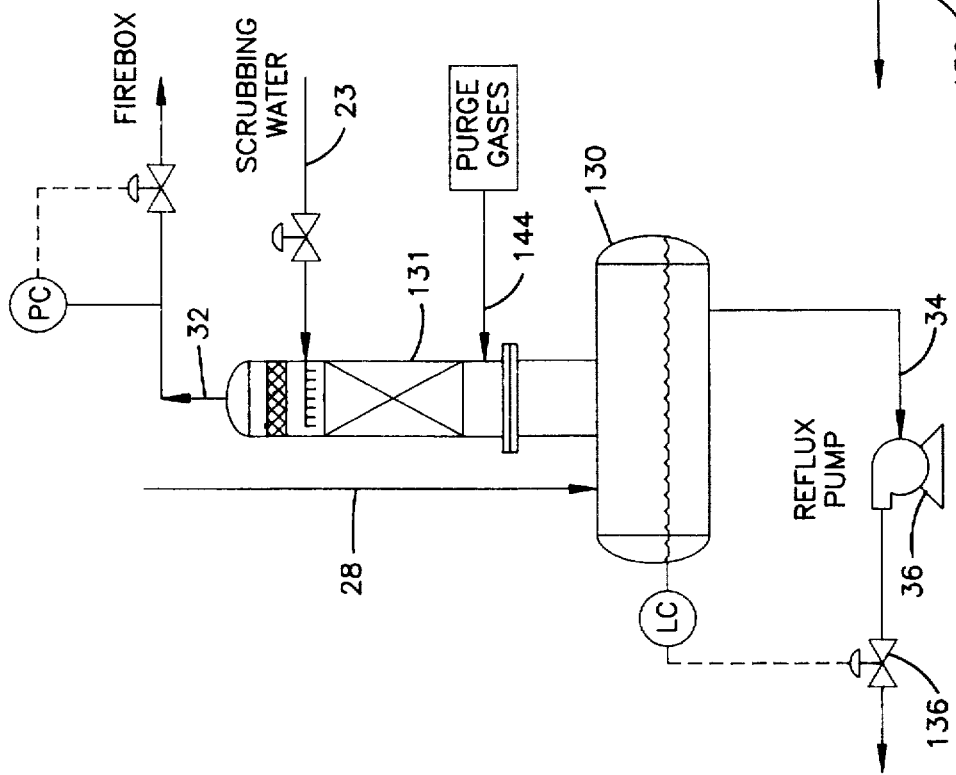
FIG. 5 is a schematic representation of a portion of the apparatus of FIG. 1 including a vent gas scrubber directly flanged to the overhead receiver and a line for delivering low pressure purge gas to the scrubber in accordance with a preferred embodiment of the invention.

In an alternative embodiment shown in FIG. 5, a conventional vent gas scrubber 131 is directly flanged to overhead receiver 130. The condensed overhead and any remaining non-condensed vapors after the condensing step are delivered to receiver 130 along line 28. The non-condensed vapors flow upwardly through the scrubber countercurrent to the flow of scrubbing water which is delivered to the top of the scrubber along line 23. Contaminates within the vapor are recovered within the scrubbing water and collected in overhead receiver 130 as condensed overhead. Any remaining non-condensables are vented along line 32 to the atmosphere. The condensed overhead collected in overhead receiver 130 is withdrawn along line 34 and further processed in accordance with the invention as earlier described.

Figure 6:
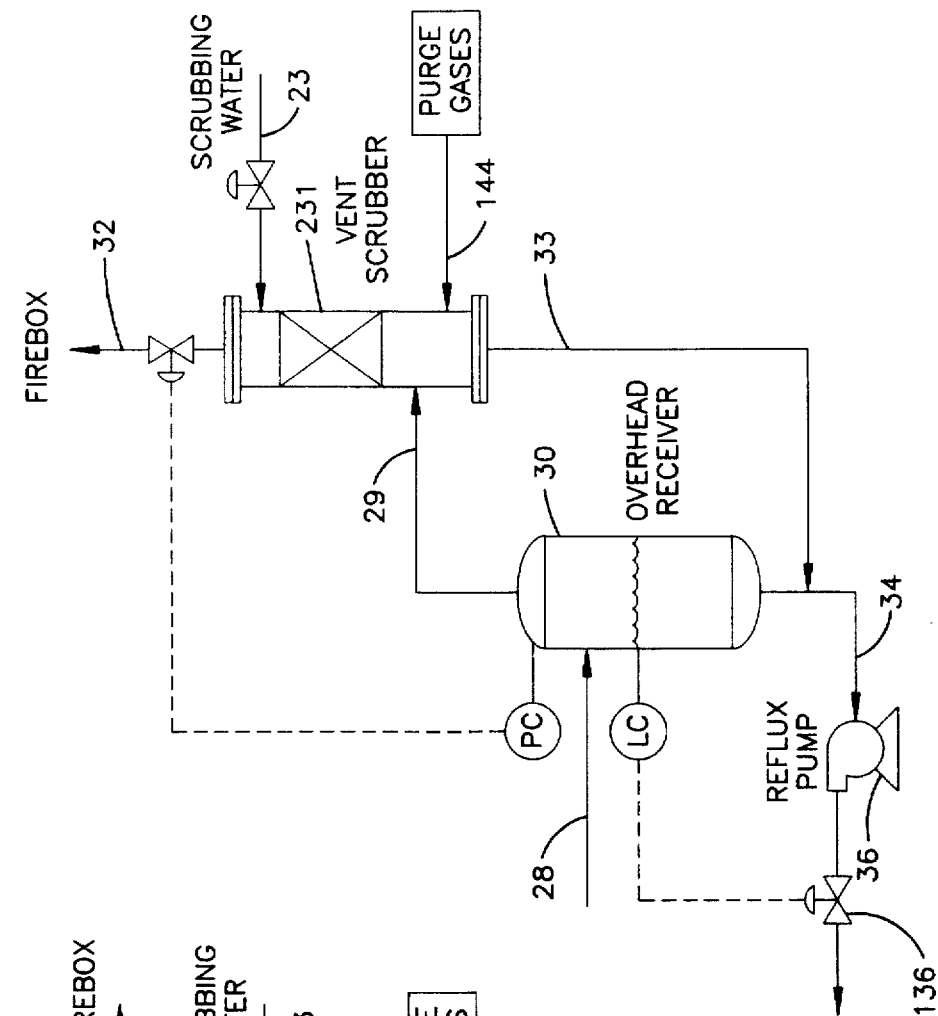
FIG. 6 is a schematic representation of a portion of the apparatus configuration of FIG. 1, wherein a separate vent scrubber is connected by flow lines to the overhead receiver and a line for delivering low pressure purge gas to the scrubber is shown in accordance with a preferred embodiment of the invention.

In still another embodiment shown in FIG. 6, an existing process condensate treatment facility in accordance with this invention may be retrofitted by adding a vent gas scrubber 231 in fluid flow contact with overhead receiver 30. In this embodiment, the condensed overhead and any remaining non-condensed vapors are transferred from the condenser along line 28 to overhead receiver 30. The non-condensed vapors flow from the top of overhead receiver 30 along line 29 to the base of vent gas scrubber 231. Scrubbing water is delivered to the top of the scrubber along line 23. The non-condensed vapors flow upwardly through the scrubber countercurrent to the flow of scrubbing water, and contaminates within the vapor are recovered by the scrubbing water. The contaminated scrubbing water flows downwardly through the scrubber and is withdrawn along line 33. The contaminated scrubbing water is then joined with condensed overhead withdrawn from overhead receiver 30 for further processing along line 34 in accordance with this invention.

In a preferred embodiment shown in FIGS. 5 and 6, a stream of low pressure purge gas may be delivered from the production plant to the base of vent gas scrubbers 131 and 231 respectively along a line 144. This gaseous stream may be delivered from any number of different processing units within the production plant wherein the build-up or accumulation of gases is known to occur. In an ammonia plant, for example, accumulated gases which detract from the reaction rate of processing are commonly purged under low pressure from the ammonia separator and/or from the combined product refrigerant receiver. The purged gas stream will generally comprise combustible gases such as hydrogen and methane, inert gases such as argon and nitrogen, and/or dilute amounts of contaminates such as raw materials utilized in processing, product and by-products formed in various stages of production. In the case of an ammonia plant, for example, the purged gases may include a mixture of ammonia, hydrogen, nitrogen, argon and methane.

Once the stream of low pressure purge gas is delivered to the scrubber, the purge gas will flow upwardly through the scrubber countercurrent to the flow of scrubbing water, and contaminates within the vapor are recovered (along with the contaminates removed from the non-condensed vapors of the condensed overhead) by the scrubbing water. The contaminated scrubbing water is then joined with condensed overhead withdrawn from overhead receiver 30 for further processing along line 34 in accordance with this invention. The gases after contaminant removal by the scrubber are vented from the top of the scrubber and delivered along line 32 to an outside vent or a furnace firebox. In the case of an ammonia plant, the gases will be delivered to the reformer firebox.

It should be understood that during the practice of this invention, various systems and apparatus can be employed to monitor and control the rate of flow of the processed streams and the temperature and vapor pressure of these streams. Such control systems may be based upon valve operations as shown in FIGS. 3, 5, and 6 hereof, by computer calculations and/or manual adjustments.

The apparatus used for purposes of the invention may generally be comprised of any relatively chemically inert, durable materials such as carbon steel, stainless steel, certain polymers and metal alloys known in the art. It should be understood that the apparatus including the towers, pumps, condensers, valves, receivers, and boilers are conventional and may be generally dimensioned to meet that task at hand taking into consideration the volume of vapor and liquid flow being processed and size of the ammonia processing plant.

The invention is further illustrated by the following example which is illustrative of certain embodiments designed to teach those of ordinary skill in the art how to practice the invention.

EXAMPLE 1

Retrofitting Existing Low Pressure Stripping Operation

A conventional low pressure stripping system for treating process condensate from an ammonia plant was retrofitted in accordance with the present invention. The existing system comprised a stripping tower of a carbon steel column design by Chemical Construction Company, having an internal design pressure of 155 psig at 450° and being 5' 6" in diameter by 54' by 10" tangent to tangent for condensate stripping. The tower was packed with two sections of one inch Flexirings™ packing, a product of Koch Engineering Company out of Wichita, Kans., wherein the bottom packed section of the tower had 20' depth and the top packed section was 18'2" in depth. Other tower internals including packing bed supports, liquid distributors, packing hold downs and demisters. A used kettle type reboiler was placed into service to indirectly provide stripping steam. The column boil up rate was controlled by steam to the reboiler on flow control. Column pressure control was by a pressure control valve on the overhead vapor. The overhead vapor containing steam, ammonia, methanol, and traces of alkylamines was vented to the atmosphere.

The stripping tower was revamped in accordance with the process calculations for the hydraulic loads appearing in Tables I and II above indicating that twelve theoretical stages were required to accomplish the flow sheet separation with the reflux ratio desired. Approximately two stages were needed in the enriching rectification section and ten were deemed required in the stripping section. The height equivalent to a theoretical stage or plate, HETP, was calculated to be about 2.5 to 3.0 feet based on actual column process performance data with one inch Flexirings™ in a stripping configuration. This resulted in a retro-fit process design of 30' of one inch Flexirings™ in the stripping section and 6' 3" of one inch Flexirings™ in the rectification section. A redistributor was located midway in the depth of the stripping section.

The tower was modified for process condensate feed at the top of the stripping section (column midsection) and reflux to the top of the rectifying section. One inch Flexirings™ were used for tower packing and the internals of the columns were provided by Koch Engineering. These internals include packing supports, liquid feed distributors, hold downs, redistributors, and demister. Equivalent packing is also available such as ballast rings by Glitch or High-Pack™ Packing by Norton.

The reboiler and steam control method remained unchanged when revamping from stripping only to combination rectification-stripping. Steam rate to the reboiler and the revamped stripper rectifier configuration remains essentially the same as it was in a stripping only configuration.

From the foregoing it should be understood that this invention is one well adapted to attain all ends and objects herebefore set forth together with the other advantages which are obvious and which are inherent to the structures and apparatus.

It will be understood that certain features and subcombinations are of utility and may be employed without reference to other feature and subcombinations. This is contemplated by and is within the scope of the amended claims.

Since many possible embodiments may be made of the invention without departing from the scope thereof, it is to be understood that all matter herein set forth or shown in the accompanying drawing is to be interpreted as illustrative and no in a limiting sense.

What is claimed:

1. A method for treating an ammonia production plant process effluent stream of dilute ammonia contaminants and an ammonia production plant low pressure purge gas stream of dilute ammonia contaminants, said method comprising the following steps:

stripping at least a portion of ammonia contaminants from a process effluent obtained from an ammonia production plant, wherein said stripping is conducted in a stripping section to obtain an ammonia contaminant-rich vapor stream and an aqueous bottom stream of reduced ammonia contaminant content;

rectifying said ammonia contaminant-rich vapor stream in a rectification section to obtain a concentrated overhead stream;

condensing said concentrated overhead stream to obtain ammonia contaminant-rich overhead condensate and non-condensed gases comprising trace amounts of the ammonia contaminates;

scrubbing said non-condensed gases and a purge gas stream of dilute ammonia contaminates with water so as to recover a portion of said trace amounts of the ammonia contaminates from the non-condensed gases and said dilute ammonia contaminates from the purge gas stream into said ammonia contaminant-rich overhead condensate;

recycling said overhead condensate to said rectifying step to form a closed loop so as to build up the concentration of ammonia contaminants in said overhead condensate;

separating and withdrawing from said closed loop a fraction of said overhead condensate; and reusing said fraction of the overhead condensate in the ammonia production plant.

2. A method according to claim 1, wherein said method additionally comprises collecting said aqueous bottom stream of reduced ammonia contaminant content and reusing said bottom stream in said ammonia production plant.

3. A method according to claim 2, wherein said aqueous bottom stream is used as scrubbing water for said scrubbing step.

4. A method according to claim 1, wherein said stripping section and said rectification section are housed one above another respectively in a common upright tower permitting vapor from said stripping section to pass upwardly within the common tower to the rectification section above and condensate from each section to pass downwardly within the common tower.

5. A method according to claim 1, wherein said stripping section and said rectification section are provided in separate columns in series.

6. A method according to claim 5, wherein said rectification step is conducted in a rectification section to obtain the concentrated overhead stream and a second aqueous bottom stream of reduced ammonia contaminant content, said second aqueous stream being returned to said stripping step.

7. A method according to claim 1, wherein said reusing step comprises injecting said fraction of overhead condensate withdrawn from said closed loop back into said ammonia production plant.

8. A method according to claim 7, wherein said reusing step comprises pumping said fraction of overhead condensate under pressure for entry into said ammonia production plant.

9. A method according to claim 1, wherein said separating and withdrawing step comprises separating and withdrawing from said closed loop a fraction of said overhead condensate in an amount ranging from 3 to 50% by volume of the overhead condensate in said loop.

10. A method according to claim 9, wherein said separating and withdrawing step comprises separating and withdrawing from said closed loop a fraction of said overhead condensate in an amount ranging from 5 to 20% by volume of the overhead condensate in said loop.

11. A method according to claim 1 wherein said stripping section is operable at pressures ranging from 0 psia to 300 psig.

12. A method according to claim 1, wherein said fraction of the overhead condensate is delivered to the ammonia production plant by delivering said fraction to a mixed feed coil of a primary reformer of said ammonia production plant.

13. A method according to claim 1, wherein said fraction of the overhead condensate is delivered to the ammonia production plant by delivering said fraction to an air preheat coil of a secondary reformer of said ammonia production plant.

14. A method according to claim 1, wherein said purge gas stream comprises purge gas recovered from a processing unit of the ammonia production plant, said processing unit selected from the group consisting of an ammonia separator, a combined product refrigerant receiver, or combinations thereof.

15. A method according to claim 14, wherein said fraction of the overhead condensate is delivered to the ammonia production plant by delivering said fraction to a mixed feed coil of a primary reformer of said ammonia production plant.

16. A method according to claim 14, wherein said fraction of the overhead condensate is delivered to the ammonia production plant by delivering said fraction to an air preheat coil of a secondary reformer of said ammonia production plant.

17. A method for treating a methanol production plant process effluent stream of dilute methanol contaminants and a methanol production plant low pressure purge gas stream of dilute methanol contaminants, said method comprising the following steps:

stripping at least a portion of methanol contaminants from a process effluent obtained from a methanol production plant, wherein said stripping is conducted in a stripping section to obtain a methanol contaminant-rich vapor stream and an aqueous bottom stream of reduced methanol contaminant content;

rectifying said methanol contaminant-rich vapor stream in a rectification section to obtain a concentrated overhead stream;

condensing said concentrated overhead stream to obtain methanol contaminant-rich overhead condensate and non-condensed gases comprising trace amounts of the methanol contaminates;

scrubbing said non-condensed gases and a purge gas stream of dilute methanol contaminates with water so as to recover a portion of said trace amounts of the methanol contaminates from the non-condensed gases and said dilute methanol contaminates from the purge gas stream into said methanol contaminant-rich overhead condensate and a scrubbed purge gas;

recycling said overhead condensate to said rectifying step to form a closed loop so as to build up the concentration of methanol contaminants in said overhead condensate;

separating and withdrawing from said closed loop a fraction of said overhead condensate; and reusing said fraction of the overhead condensate in the methanol production plant.

18. A method according to claim 17, wherein said method additionally comprises collecting said aqueous bottom stream of reduced methanol contaminant content and reusing said bottom stream in said methanol production plant.

19. A method according to claim 18, wherein said aqueous bottom stream is used as scrubbing water for said scrubbing step.

20. A method according to claim 17, wherein said purge gas stream comprises purge gas recovered from a processing unit of the methanol production plant, said processing unit selected from the group consisting of a methanol separator, a combined product refrigerant receiver, or combinations thereof.

21. A method according to claim 17 further comprising disposing of the scrubbed purge gas.

22. A method according to claim 21 wherein disposing of scrubbed purge gas comprises delivering the scrubbed purge gas to a furnace firebox.

23. A method according to claim 21 wherein disposing of scrubbed purge gas comprises delivering the scrubbed purge gas to a vent.

* * * * *

UNITED STATES PATENT AND TRADEMARK OFFICE
CERTIFICATE OF CORRECTION

PATENT NO. : 5,779,861
DATED : July 14, 1998
INVENTOR(S) : Allan Holiday, et al.

It is certified that error appears in the above-identified patent and that said Letters Patent is hereby corrected as shown below:

On the title page insert item -- notice [*] The term of this patent shall not extend beyond the expiration date of Pat. No 5,643,420--

Signed and Sealed this

Thirty-first Day of August, 1999

Attest:

Q. TODD DICKINSON

*Attesting Officer*

*Acting Commissioner of Patents and Trademarks*